United States Patent
Donzis et al.

(10) Patent No.: US 7,908,481 B1
(45) Date of Patent: Mar. 15, 2011

(54) ROUTING DATA TO ONE OR MORE ENTITIES IN A NETWORK

(75) Inventors: Lewis T. Donzis, San Antonio, TX (US); Earnest E. Hughes, San Antonio, TX (US)

(73) Assignee: Avaya Inc., Basking Ridge, NJ (US)

( * ) Notice: Subject to any disclaimer, the term of this patent is extended or adjusted under 35 U.S.C. 154(b) by 1758 days.

(21) Appl. No.: 10/881,859

(22) Filed: Jun. 30, 2004

Related U.S. Application Data (63) Continuation of application No. 09/465,629, filed on Dec. 17, 1999, now abandoned.

(51) Int. Cl.
*H04L 29/06* (2006.01)
*H04L 29/00* (2006.01)
*H04L 29/08* (2006.01)
*H04L 29/10* (2006.01)

(52) U.S. Cl. ........ 713/171; 713/168; 713/169; 713/170; 713/155; 380/229; 380/227; 709/225; 709/227; 709/228; 709/229

(58) Field of Classification Search ........................ None
See application file for complete search history.

(56) References Cited

U.S. PATENT DOCUMENTS

| | | | |
|---|---|---|---|
| 5,793,763 A | 8/1998 | Mayes et al. | |
| 6,055,236 A * | 4/2000 | Nessett et al. | 370/389 |
| 6,067,620 A | 5/2000 | Holden et al. | |
| 6,275,588 B1 * | 8/2001 | Videcrantz et al. | 380/255 |
| 6,330,562 B1 * | 12/2001 | Boden et al. | 713/167 |
| 6,353,614 B1 | 3/2002 | Borella et al. | |
| 6,457,061 B1 * | 9/2002 | Bal et al. | 709/245 |
| 6,615,357 B1 * | 9/2003 | Boden et al. | 726/15 |
| 6,697,354 B1 * | 2/2004 | Borella et al. | 370/352 |
| 7,023,863 B1 * | 4/2006 | Naudus et al. | 370/401 |
| 7,028,335 B1 * | 4/2006 | Borella et al. | 726/11 |
| 7,032,242 B1 * | 4/2006 | Grabelsky et al. | 726/11 |
| 7,346,770 B2 * | 3/2008 | Swander et al. | 713/153 |
| 7,370,348 B1 * | 5/2008 | Patel et al. | 726/5 |
| 7,373,429 B2 * | 5/2008 | Furukawa et al. | 709/249 |
| 7,583,668 B1 * | 9/2009 | Mayes et al. | 370/389 |
| 2002/0062344 A1 * | 5/2002 | Ylonen et al. | 709/204 |
| 2003/0182431 A1 * | 9/2003 | Sturniolo et al. | 709/227 |

OTHER PUBLICATIONS

Maughan et al., Internet Security Association and Key Management Protocol (ISAKMP), Nov. 1998, Request for Comments (RFC) 2408, pp. 1-79.*

Lucent Technologies, Inc., *Virtual Private Networks Resource Guide*, printed from web site http://www.ascend.com, pp. 1-4, dated at least as early as Nov. 19, 1999.

(Continued)

*Primary Examiner* — Syed A. Zia (74) *Attorney, Agent, or Firm* — Trop Pruner & Hu, P.C.

(57) ABSTRACT

A communications system includes a first network that includes a plurality of entities and a router. The router includes a network address translator. A node is capable of communicating data units with entities in the first network. Each data unit includes security information, such as information according to the Internet Security Association and Key Management protocol (ISAKMP) and the Encapsulating Security Payload (ESP) protocol. The network address translator is adapted to convert a destination address in a received data unit from the node to an address of one of the entities based on the security information in the received data unit.

22 Claims, 9 Drawing Sheets

OTHER PUBLICATIONS

*VPN Home Page*, printed from web site http://www.rad.com, pp. 1-5, dated at least as early as Nov. 19, 1999.

Robin Gareiss, *Frame Relay VS. IP: It's Your Move*, printed from web site http://www.data.com, pp. 1-20 (Feb. 1997).

Vicomsoft, *Network Address Translation*, printed from web site http://www.vicomsoft.com, pp. 1-11, dated at least as early as Nov. 23, 1999.

*IP Encapsulating Security Payload (ESP)*, Request for Comments (RFC) 2406, pp. 1-21 (Nov. 1998).

*Security Architecture for the Internet Protocol*, Request for Comments (RFC) 2401, pp. 1-61 (Nov. 1998).

*Internet Security Association and Key Management Protocol (ISAKMP)*, Request for Comments (RFC) 2408, 1-79, (Nov. 1998).

*Internet Protocol DARPA Internet Program Protocol Specification*, Request for Comments (RFC) 791, 1-50 (Sep. 1981).

* cited by examiner

| SRC ADDR | DEST ADDR | SRC PORT | DEST PORT | INITIATOR COOKIE | RESPONDER COOKIE |

*110*

| CLIENT TO ROUTER | A | Y | 500 | 500 | IC | 0 |

| ROUTER TO SERVER | X | Y | 500 | 500 | IC | 0 |

| SERVER TO ROUTER | Y | X | 500 | 500 | IC | RC |

| ROUTER TO CLIENT | Y | A | 500 | 500 | IC | RC |

ROUTING DATA TO ONE OR MORE ENTITIES IN A NETWORK

CROSS REFERENCE TO RELATED APPLICATIONS

This is a continuation of U.S. Ser. No. 09/465,629, filed Dec. 17, 1999 now abandoned, which is hereby incorporated by reference.

BACKGROUND

The invention relates to routing data to one or more entities in a network.

Communications over data networks may include electronic mail, file access, web browsing, electronic commerce transactions, telephonic communications, video conferencing, and so forth. Networks may include private networks, such as local area networks (LANs) or wide area networks (WANs), and public networks, such as the Internet. Private networks are networks in which access is restricted to authorized users, while public networks are generally accessible.

To prevent unauthorized access of data communicated over either public or private data networks, various security protocols have been implemented to allow for encryption of data and authentication of sources of data. One such security protocol is Internet Protocol Security (IPSec), as described in part by Request for Comments (RFC) 2401, entitled "Security Architecture for the Internet Protocol," dated November 1998. Using security protocols, secure communications (such as those that are part of electronic commerce transactions, file access, and so forth) may be possible over data networks. For example, a web server may be set up by a business that offers goods or services for sale over public networks. A secure communications session may be established between a user and the web server over the public networks so the user can securely provide his or her private information.

Another application of secure communications is in virtual private networks (VPNs). In some conventional systems, access to private networks from distant locations (such as from branch offices or by remote users) is performed by direct dial-up or by dedicated point-to-point lines to provide secure links. However, direct dial-up and dedicated point-to-point lines are typically more expensive than the alternative of accessing the private network over a public network such as the Internet. To enable secure communications over a public network to one or more private networks, VPNs may be used. A VPN includes a public network as the primary transport medium, with communications protected by a security protocol. By using a VPN, a convenient and cost-effective mechanism is afforded users who desire to remotely access a private network.

Data networks may include Internet Protocol (IP) networks, in which routers may be used to route data packets to appropriate destinations based on addresses contained in the data packets. An IP packet typically includes a source address and a destination address to identify the source and destination of the packet. Different network entities are typically assigned different IP addresses.

However, in some arrangements, multiple entities in a network (particularly a network associated with home or small business users) may share a single IP address. This allows multiple nodes or entities in the network to share an inexpensive Internet access account and also makes network administration more convenient. Further, sharing of IP addresses by multiple nodes alleviates the problem of limited available IP addresses. To enable sharing of a common IP address, a router may include a network address translator (NAT). A NAT operates by modifying the headers of IP packets as they pass through the router so that packets leaving a router to a public network have a common IP address, regardless of which of plural entities in a local network originated the packets. Likewise, when packets are received from the public network by the router, addressed to the single common address, a router determines which of the plural entities in the local network the packet belongs to and modifies the destination address accordingly.

Conventionally, the address translation may be performed by using port numbers contained in the packets to uniquely identify entities in the local network sharing a common address. The port numbers may be those defined by the Transmission Control Protocol (TCP) or User Datagram Protocol (UDP), as examples. By associating a different port number with each of the plural entities in the network, the router can route a packet to the appropriate one of the entities even though a common IP address is used for all of the entities.

Although such many-to-one address translations may be performed for regular IP packets, it may not be possible if the packets are protected according to certain security protocols, such as IPSec. Under IPSec, an Internet Security Association and Key Management Protocol (ISAKMP) defines procedures and packet formats to establish, negotiate, and provide security services between various network entities. Once the desired security services have been negotiated between two entities, traffic may be carried in IP Encapsulating Security Payload (ESP) packets. In packets protected by ISAKMP and ESP, TCP or UDP ports may not be available to uniquely identify plural entities that are associated with a common IP address. Without the ability to differentiate by TCP or UDP ports, a router with a NAT would be unable to identify the target entity in a network when it receives a packet protected by a security protocol (such as ISAKMP or ESP) that includes a shared destination IP address.

A need thus exists for a method and apparatus to allow for network address translation in communications protected by a security protocol.

SUMMARY

In general, according to one embodiment, a method of routing a data unit targeted to one of plural entities in a network includes receiving the data unit containing security information and address information. The address information is translated to an address of a target entity in the network based on the security information.

Some embodiments of the invention may include one or more of the following advantages. Security may be provided for communications with network entities that share a network address. The ability to share a network address among plural network entities may reduce costs by allowing nodes to share a single Internet access account and making network administration more convenient. Also, security may be provided in communications over public networks between remote locations in which at least one of the remote locations includes a network (such as one associated with a virtual private network) having entities that share a common network address.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
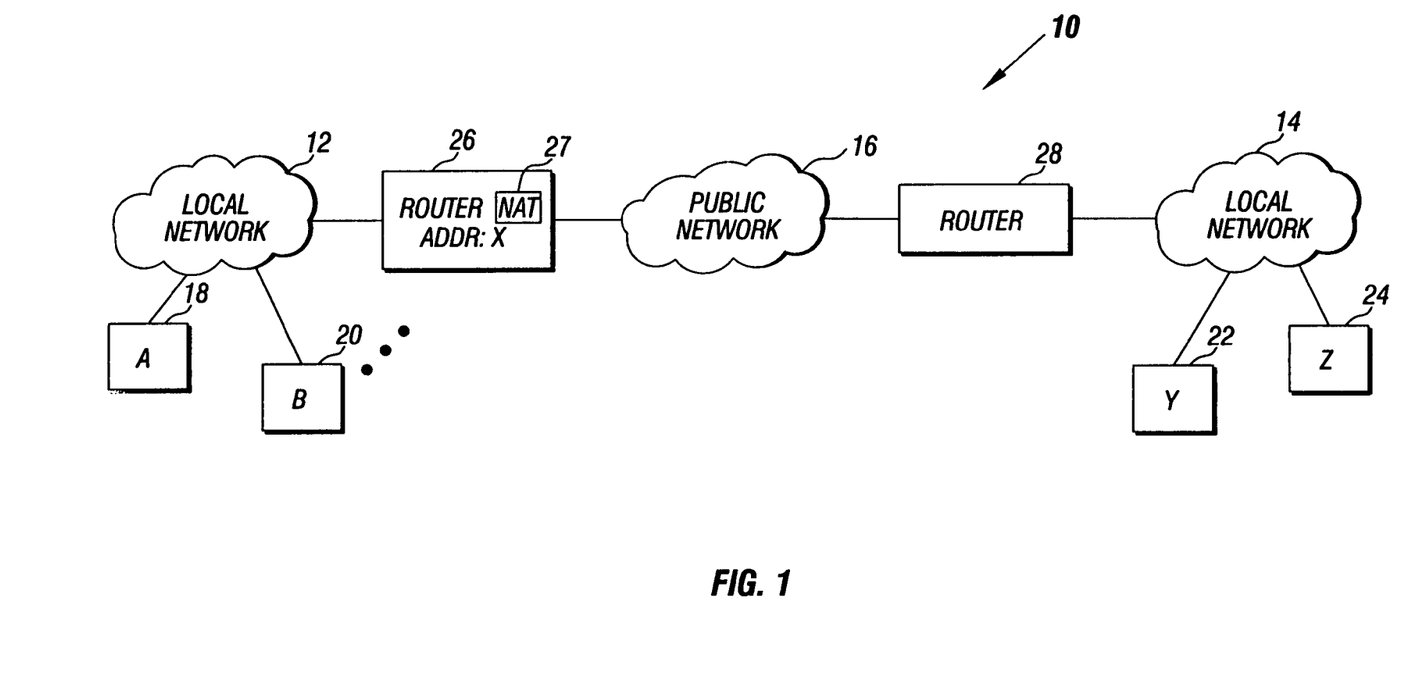
FIG. 1 is a block diagram an embodiment of a communications system capable of performing secured communications.

Referring to FIG. 1, an example communications system 10 includes local networks 12 and 14, which may be private networks, and a public network 16 (such as the Internet) that interconnects the local networks 12 and 14. A "network" may refer to one or more communications networks, links, channels, or paths. A "private network" refers to a network that is protected against unauthorized general public access. Although reference is made to "private" and "public" networks in this description, further embodiments may include networks without such designations.

The local network 12 may be coupled to multiple nodes, with 18 and 20 illustrated. The other local network 14 may also be coupled to multiple nodes, with nodes 22 and 24 illustrated. A router 26 coupled to the local network 12 and a router 28 coupled to the local network 14 are used to route data units over the public network 16 to nodes tied to the local networks 12 and 14.

In one embodiment, the router 26 may include a network address translator (NAT) to allow the multiple nodes coupled to the local network 12 to share a common "outside" address, that is, the address visible to nodes outside the local network 12. This shared or common address is used by outside nodes (those nodes not coupled to local network 12) to communicate with nodes coupled to the local network 12. Within the local network 12, however, each of the nodes may be assigned unique local network addresses. Thus, for example, node 18 is assigned local network address A, node 20 is assigned local network address B, and so forth. When one of the nodes 18 and 20 sends a data unit (which may be a message, packet, or some other unit of data) to the router 26 for routing over the public network 16, the router 26 converts the local network address (A or B), which is the source address, to the shared or common outside address (e.g., address X).

A data unit targeted from outside the local network 12 to one of the local nodes 18 and 20 as received by the router 26 contains the destination address X (the shared or common address). The NAT 27 in the router 26 converts the destination address X to the appropriate one of local network address A, B, or other address, depending on which of the nodes tied to the local node 12 is the destination.

The network architecture shown in FIG. 1 may be a virtual private network (VPN) architecture, in which the local network 12 is a remote network and the local network 14 is a "home" or central network. For example, the remote network may be located in a branch office and the home network may be located at corporate headquarters. The VPN uses the public network 16 as the primary transport medium over which communications can occur between the local networks 12 and 14. The communications may be safeguarded by employing a security protocol to encrypt data and authenticate sources of data. In a further embodiment, the architecture of FIG. 1 or some variation of it may be employed for another type of network (instead of a VPN).

Conventionally, the NAT 27 in the router 26 uses port numbers specified in a data unit to perform the address translation. Such port numbers may be according to the Transmission Control Protocol (TCP) or the User Datagram Protocol (UDP). TCP is described in Request for Comments (RFC) 793, entitled "Transmission Control Protocol," dated September 1981; and UDP is described in RFC 768, entitled "User Datagram Protocol," dated August 1980. In one embodiment, the data units may be packets or datagrams according to the Internet Protocol (IP), as described in RFC 791, entitled "Internet Protocol," dated September 1981. Other versions of IP, such as IPv6, or other standards may be used in further embodiments for communications over various data networks. IPv6 is described in RFC 2460, entitled "Internet Protocol, Version 6 (IPv6) Specification," dated December 1998.

With certain security protocols, however, such as the IP security (IPSec) protocol, the TCP or UDP ports may not be available for use in performing the desired address translation. The IPSec protocol is described in part by RFC 2401, entitled "Security Architecture for the Internet Protocol," dated November 1998.

Under IPSec, an Internet Security Association and Key Management Protocol (ISAKMP) defines procedures and packet formats to establish, negotiate, and provide security services between various network entities. Once the desired security services have been negotiated between two entities, traffic may be carried in IP Encapsulating Security Payload (ESP) packets. ISAKMP is described in RFC 2408, entitled "Internet Security Association and Key Management Protocol (ISAKMP)," dated November 1998; and ESP is described in RFC 2406, entitled "IP Encapsulating Security Payload (ESP)," dated November 1998.

However, with ISAKMP or ESP, TCP or UDP ports are not available to uniquely identify the multiple nodes coupled to the local network 12. In accordance with some embodiments, instead of using UDP or TCP ports, the NAT 27 in the router 26 uses predetermined security information in ISAKMP or ESP data units to perform address translation. In one arrangement, the security information may be stored in address translation tables that are accessible by the NAT 27 for performing address translations. When a data unit is received by the router 26 over the public network 16, the NAT 27 matches address and security information in the data unit to an address translation table to determine the local network address of the destination node in the local network 12. Once a match is found, the NAT 27 can convert the shared or common address X to the local network address.

Figure 3A:
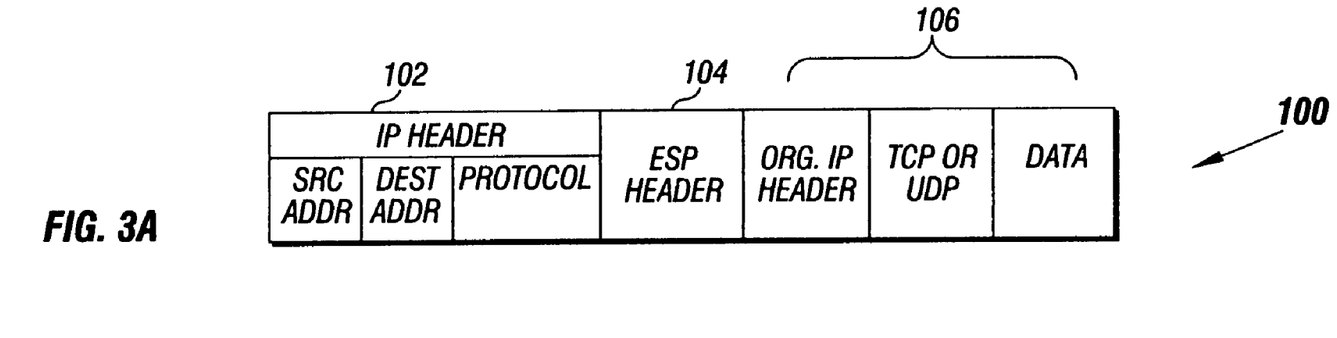
FIGS. 3A and 3B illustrate messages according to an Encapsulating Security Payload (ESP) protocol and an Internet Security Association and Key Management Protocol (ISAKMP).

Referring to FIG. 3A, an IP packet 100 that includes ESP information is illustrated. The IP packet 100 includes an IP header 102, an ESP header 104, and a protected payload section 106, which may include the original IP header, TCP or UDP port numbers, and the data payload. The IP header 102 includes a source address, a destination address, and a protocol identifier to indicate the next level protocol that is used (e.g., TCP, UDP, or ESP). The IP packet 100 may include additional ESP-related information after the payload section 106. Since the payload section 106 is protected by encryption, the UDP or TCP port information is inaccessible by the NAT 27 for purposes of address translation. In accordance with some embodiments, instead of using the TCP or UDP information, predetermined security information in the ESP header 104 is used.

Figure 3B:
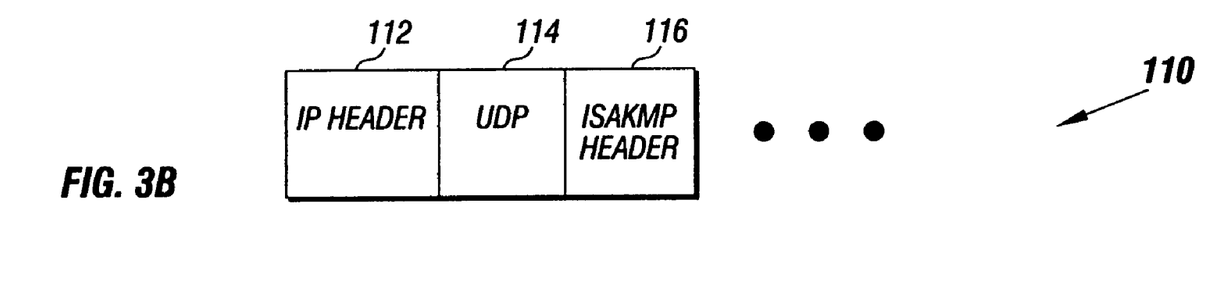

Referring to FIG. 3B, an IP packet 110 that includes ISAKMP information is illustrated. The IP packet 110 includes an IP header 112, a UDP port field 114, an ISAKMP header 116, and other information. The UDP port field 114 may include a source port and a destination port. However, according to a version of ISAKMP, the source and destination ports are assigned port 500. As a result, the NAT 27 in the router 26 is unable to use the UDP port information to differentiate between multiple nodes coupled to the local network 12 that share a common address. In accordance with some embodiments, predetermined security information in the ISAKMP header 116 is used instead to perform address translation.

For purposes of the following description, the nodes coupled to the local network 12 are referred to as client nodes, and the node (22) coupled to the local network 14 is referred to as a server node. In one example arrangement, the client nodes in the local network 12 may be VPN nodes that are capable of communicating with a node (server) in the home network 14. However, the client and server labels may be interchangeable or omitted in other arrangements.

Figure 2:
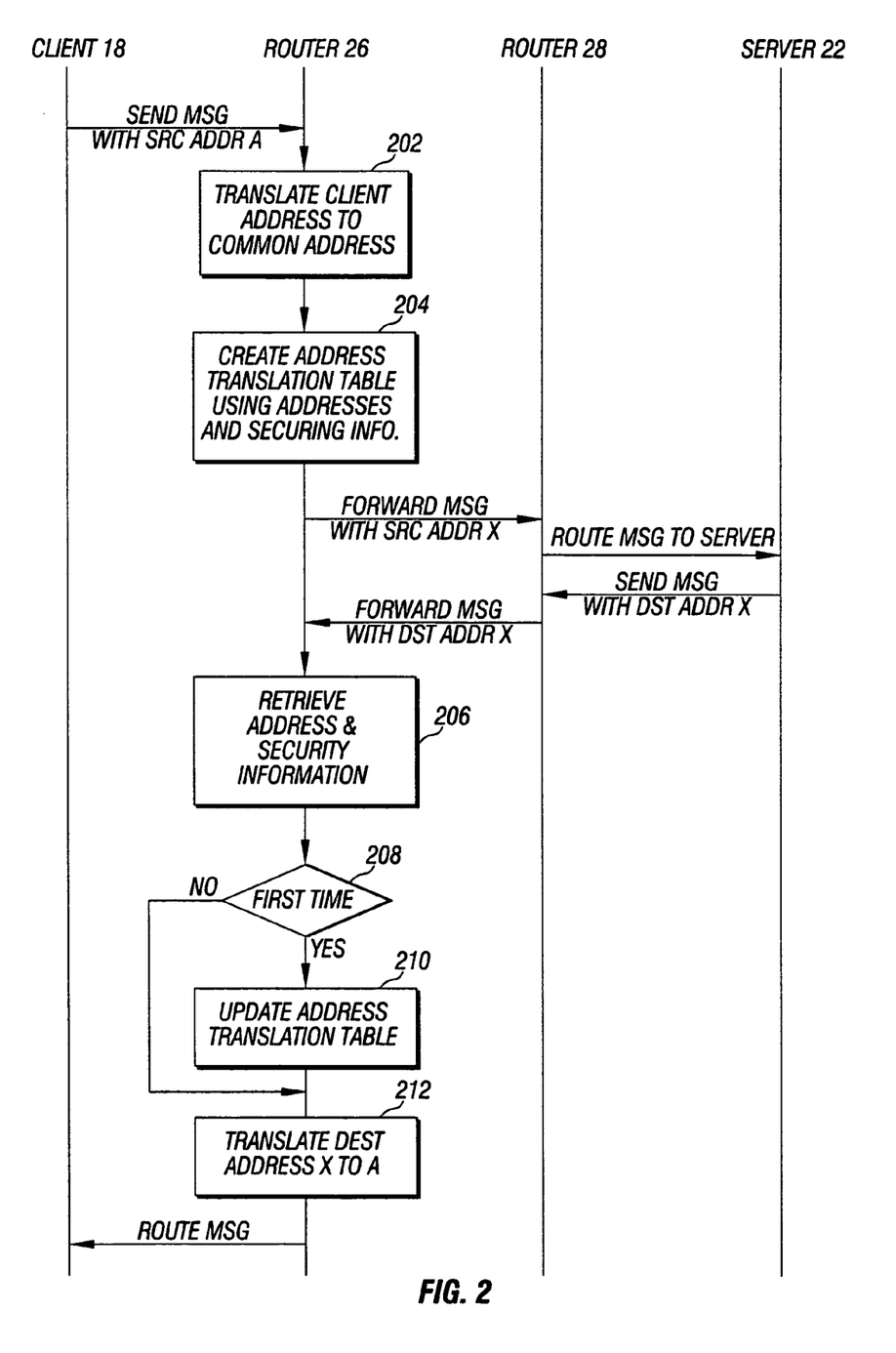
FIG. 2 is a flow diagram of a process in accordance with one embodiment of translating addresses in the messages communicated between a client system, a server system, and routers.

Referring to FIG. 2, an example communications session is established between the client node 18 (assigned local network address A) and the server node 22 (assigned address Y). The client node 18 may first send a message to the router 26 (associated with address X) that is targeted for the server node 22 in the local network 14. The message may be an IP packet that includes the source address A, destination address Y, and ESP or ISAKMP information. When the router 26 receives the message, the NAT 27 translates the client address A to the common address X (at 202). Next, if one does not already exist, an address translation table for translating between address A and X may be created (at 204) for use by the NAT 27 to perform address translation. The address translation table may include the source address A, the destination address Y of the server node 22 (the destination), and predetermined security information in the message to provide a pattern that can be matched to information in a received message to perform address translation.

The router 26 next forwards the message, which now contains the source address X instead of A to the router 28 over the public network 16. When the router 28 receives the message, it routes the message to the destination specified in the message, which in this example is the server node 22.

The message from the client node 18 to the server node 22 may be one which seeks a response (such as an acknowledge message or other message) from the server node 22. If so, the server node 22 may generate a message that is sent with a source address Y (of the server node 22) and a destination address X (of the router 26). The message further includes security information according to ESP or ISAKMP. When the router 28 receives the message from the server node 22, it forwards the message to the router 26 based on the destination address X.

When the router 26 receives the message originated by the server node 22, the NAT 27 retrieves (at 206) the address and security information that is contained in the message. The NAT 27 then determines (at 208) if this is the first time that a message from the server node 22 has been received with the source address Y and associated security information. If so, the address translation table is updated (at 210) with further information for subsequent use by the NAT 27. The source address and security information are then matched (at 212) to information in the address translation table to translate the destination address X to the address A associated with the client node 18. After translation of the destination address, the message is routed to the client node 18. The address translation table may be used in subsequent communications between the client node 18 and server node 22.

Figure 4:
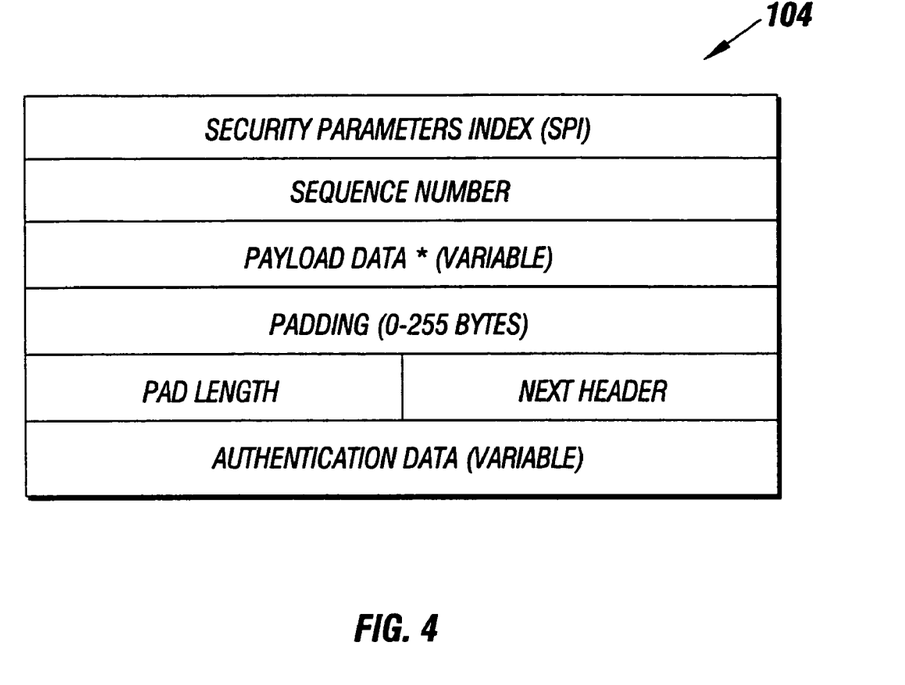
FIG. 4 illustrates contents of an ESP header.
Figure 5:
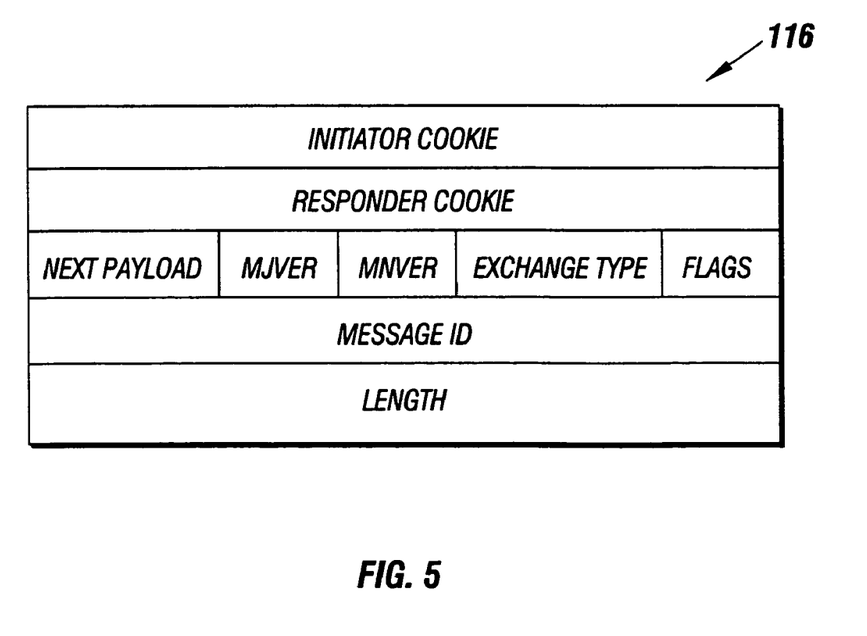
FIG. 5 illustrates contents of an ISAKMP header.

Referring to FIGS. 4 and 5, the predetermined security information used by the NAT 27 for address translation is described. As shown in FIG. 4, an ESP header 104 includes a security parameters index (SPI) field, which is an arbitrary value (containing a random number) that, in combination with the destination IP address and security protocol (ESP), uniquely identifies security services (referred to as a "security association") to be performed on the associated packet. In one example, the SPI field may be a 32-bit value, although the SPI field may have other lengths in further embodiments. The remaining fields in the ESP header 114 include a sequence number field, a payload data section, padding, and other information as defined by the ESP protocol.

In accordance with an embodiment of the invention, the SPI value is used by the NAT 27 to perform address translation. The SPI is ordinarily selected by a receiving or destination system upon establishment of a security association (SA). When an SA is initially established, one side assumes the role of initiator and the other the role of responder. An initiator can propose one or more security policies to the responder. The responder can then select one or the proposed security services offered by the initiator. Different SPIs may be used in communications sessions between a pair of nodes depending on which is the source and which is the destination.

Referring to FIG. 5, an ISAKMP header 116 includes an initiator cookie and a responder cookie as well as other information as defined by ISAKMP. The initiator and responder cookies are used to identify ISAKMP security associations. The ISAKMP security associations are used during negotiation between the initiator and responder to protect negotiation traffic between the two entities. For packets containing ISAKMP security information, the initiator and responder cookies are used by the NAT 27 to perform address translation for the packets. The initiator and responder cookies may also contain random numbers.

Use of random numbers in the SPI or initiator and responder cookies makes it highly likely that the SPI or cookies are unique. This allows the NAT 27 to reliably translate the common address X of a received packet to the local network address of the target node based on the security information.

Figure 6:
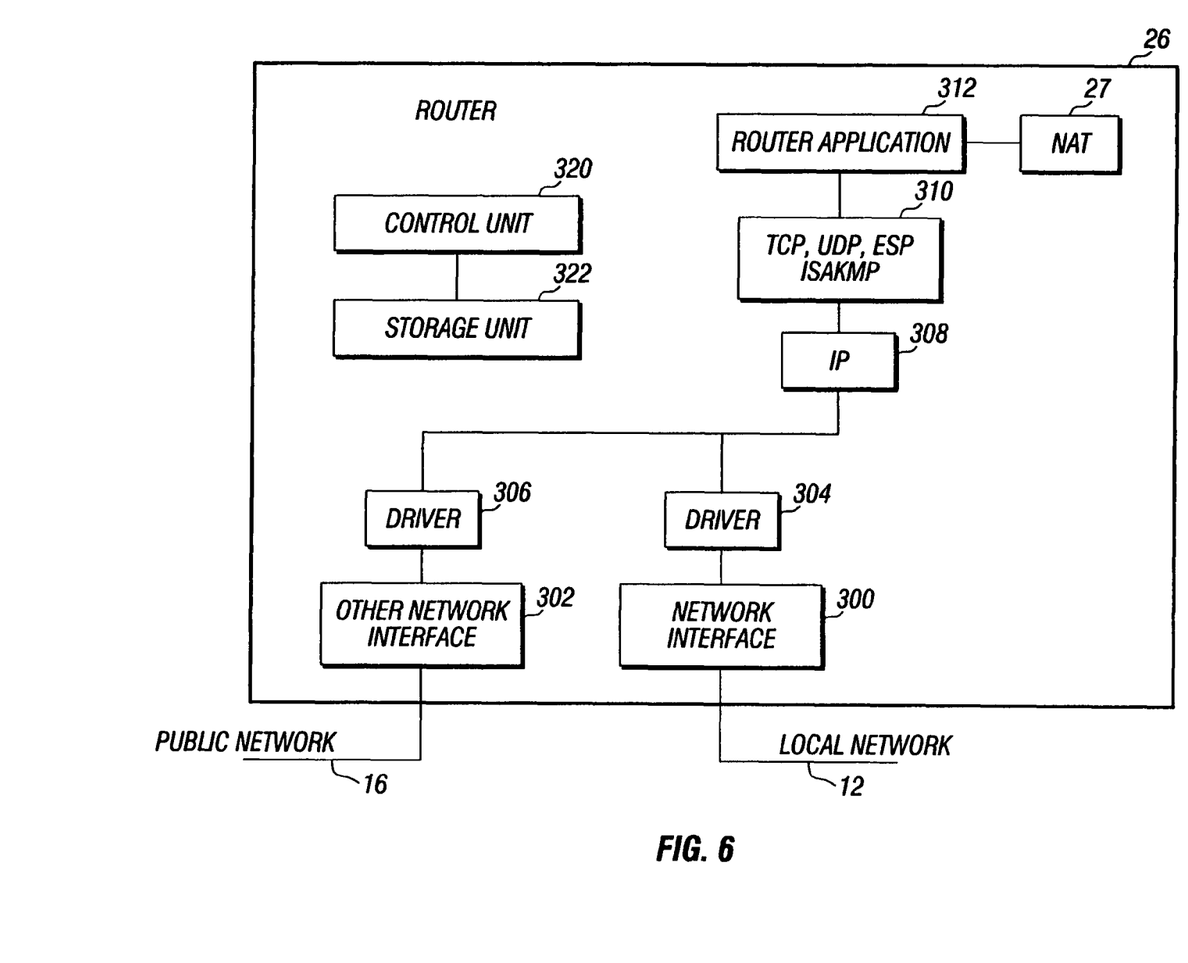
FIG. 6 illustrates components in a router in accordance with one embodiment.

Referring to FIG. 6, the components of the router 26 are illustrated in greater detail. The router 26 includes a first network interface 300 that communicates with the local network 12 and a second network interface 302 that communicates with the public network 16. Each of the network interfaces 300 and 302 is associated with a driver 304 and 306, respectively. Above the driver layer may be a network communication stack that includes an IP layer 308 as well as TCP, UDP, ESP, and/or ISAKMP layers 310. Packets received from the local network 12 or public network 16 are sent up through the driver, IP, and TCP, UDP, ESP, and/or ISAKMP layers to a router application 312, which performs routing of the packets based on the source and destination addresses in the packets. In addition, the NAT 27 cooperates with the router application 312 to translate the source or destination address of each packet (depending on whether the packet is outbound from or inbound to the local network 12).

The router application 312, NAT 27, network stack layers, drivers, and other software routines or modules in the router 26 may be executable on a control unit 320. Data and instructions associated with the software routines may be stored in a storage unit 322. Other routers may have similar or modified arrangements as the arrangement of the router 26 shown in FIG. 6.

Figure 7A:
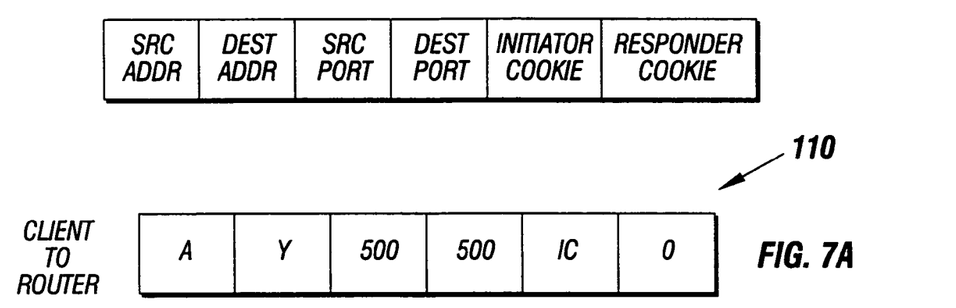
FIGS. 7A-7D illustrate contents of an ISAKMP message during transmission and reception of the message.
Figure 7B:
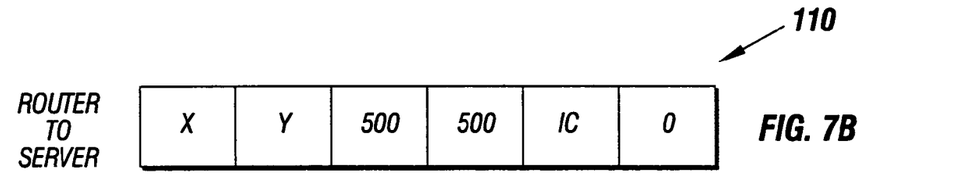

Referring to FIGS. 7A-7D, the values of various fields in the IP packet 110 (FIG. 3B) containing ISAKMP information are illustrated. The fields include the source and destination addresses, source and destination UDP ports, and the initiator and responder cookies. In FIG. 7A, the packet 110 sent from the client node 18 to the router 26 contains a source address A, a destination address Y, source and destination ports 500 (as required by a version of ISAKMP), an initiator cookie having a value IC, and a responder cookie having a null or unspecified value. The responder cookie is unknown at this point. Upon receipt of the message, the NAT 27 in the router 26 converts the source address A to the shared address X, as illustrated in FIG. 7B.

Figure 8A:
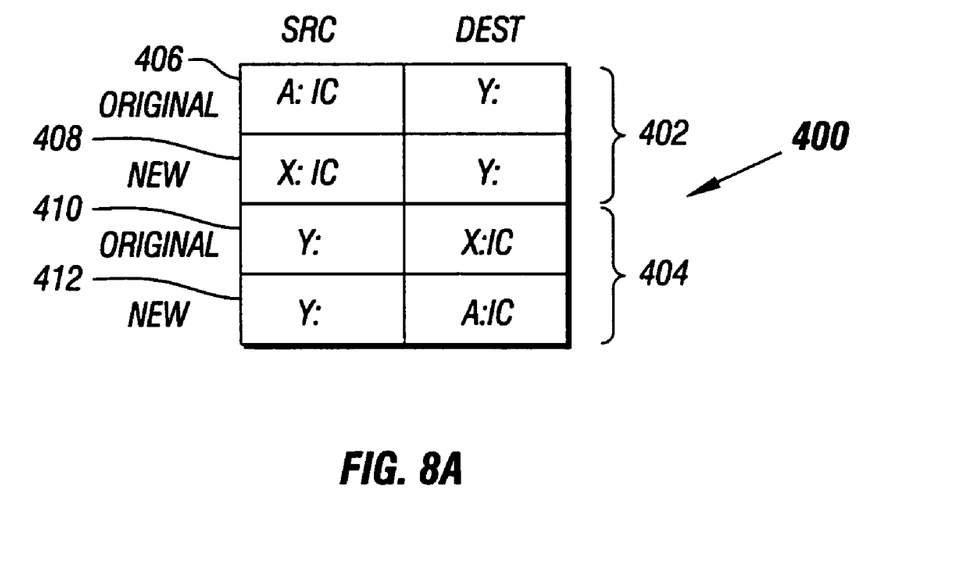
FIGS. 8A and 8B illustrate contents of an address translation table that contains fields for storing initiator and responder cookies that are part of ISAKMP messages exchanged between a client system and a server system in accordance with one embodiment.

Referring further to FIG. 8A, an address translation table 400 may be created by the NAT 27. The address translation table 400 is used by the NAT 27 to translate a destination address in a message targeted for the client node 18. In one example arrangement, the table 400 includes two columns, a source column and a destination column. The table further includes an outbound section 402 and an inbound section 404. The outbound section 402 tracks the translation of the source address in an outbound message, while the inbound section 404 tracks the translation of the destination address in an inbound message.

As shown in FIG. 8A, the outbound section 402 includes a row 406 storing address and security information associated with a message from the client node 18 to the router 26. The outbound section 402 also includes a row 408 that includes the translated address information and security information in the outbound message. In the row 406, the source address A and associated initiator cookie IC value may be stored in the source column, while the destination address Y is stored in the destination column. In the row 408, the translated source address X and initiator cookie value IC are stored in the source column and the destination address Y is stored in the destination column. The responder cookie value is not included in the table 400 as shown in FIG. 8A because the responder cookie value is not known at this time.

The inbound section 404 may also be partially filled in at this time, with a row 410 containing the source address Y in the source column and the destination address X and initiator cookie IC in the destination column. A row 412 contains the source address Y and the translated destination address A and initiator cookie IC. It is noted that FIG. 8A illustrates one example of an address translation table, with other arrangements of the table being possible in further embodiments. Any arrangement of the address translation table in which a pattern containing address and security information may be matched to corresponding information in a received message may be used in such further embodiments.

Figure 7C:
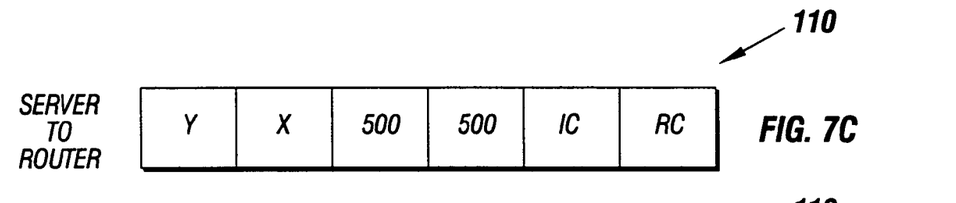
Figure 7D:
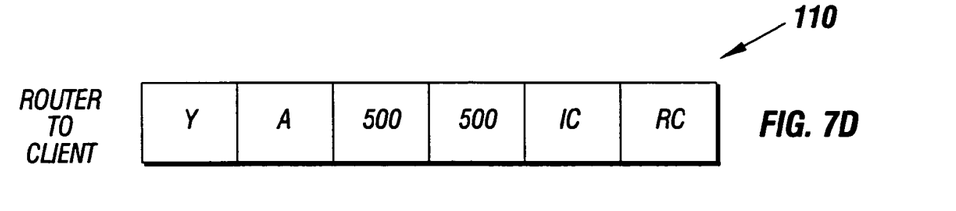
Figure 8B:
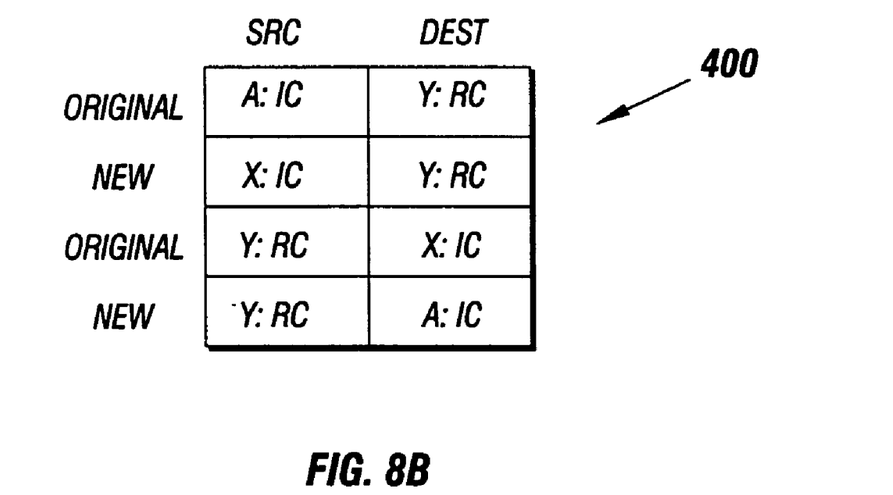

As shown in FIG. 7C, when the server node 22 sends a message targeted for the client node 18, the packet 110 contains a source address Y and a destination address X, source and destination ports with port number 500, an initiator cookie IC and a responder cookie RC. Upon receipt of the message by the router 26, the NAT 27 matches the address Y and initiator and responder cookies IC and RC to the translation table 400. Since the example shows the first communications session between the client node 18 and the server node 22, the table 400 is not completely filled in. The NAT 27 attempts to obtain an exact match of the address and security information in a received message to an address translation table. If an exact match is not found, then the NAT 27 finds a partially filled address translation table, such as the one shown in FIG. 8A. The partially filled address translation table 400 can then be updated with the remaining information, which in this example is the responder cookie RC. The complete address translation table 400 is shown in FIG. 8B. The address translation table 400 may then be subsequently accessed by the NAT 27 to match address and security information in a received packet to convert the destination address X to the local network address of the target node (e.g., network address A of the client node 18), as shown in FIG. 7D.

The pattern in the address translation table 400 that the NAT 27 uses to match address and security information includes the common address X, initiator cookie IC, and responder cookie RC. From the matched pattern, the target network address A can be determined.

Figure 9A:
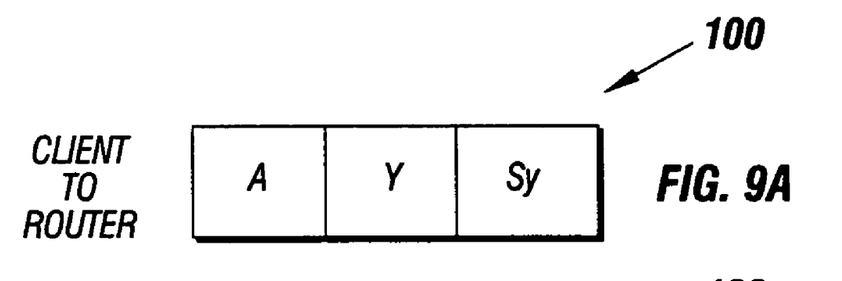
FIGS. 9A-9D illustrate contents of an ESP message during transmission and reception of the message in accordance with one embodiment.
Figure 9B:
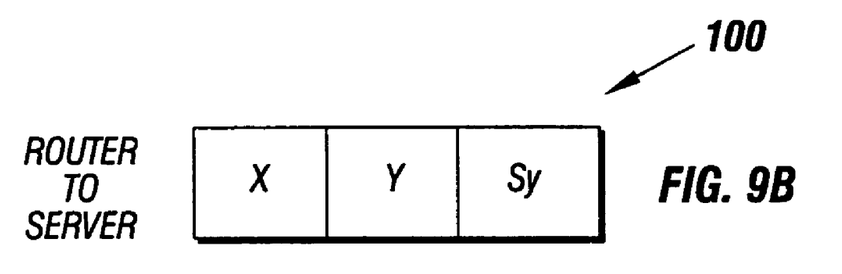

Referring to FIGS. 9A-9D, the processing of a packet 100 containing ESP information by the NAT 27 is illustrated. As shown in FIG. 9A, the client node 18 may send the router 26 a packet 100 containing a source address A, a destination address Y, and an SPI value Sy (which is the SPI value of the destination server node 22). Upon receipt of the packet 100 by the router 26, the NAT 27 converts the source address A to X (as shown in FIG. 9B) and sends the message on to the destination server node 22.

Figure 10A:
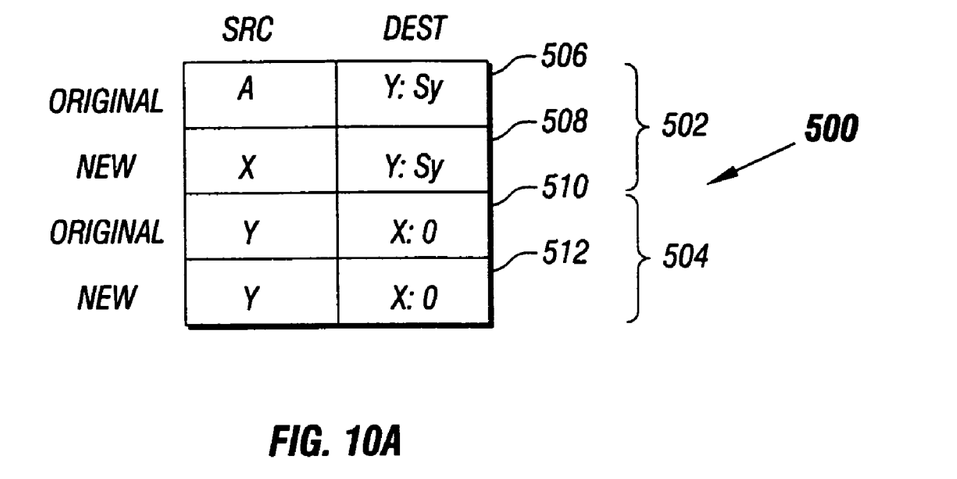
FIGS. 10A and 10B illustrate contents of an address translation table containing fields for storing ESP information in accordance with an embodiment.

Referring further to FIG. 10A, an address translation table 500 may be created (if this is the first session between client node 18 and server node 22) that includes a source column and a destination column and an outbound section 502 and inbound section 504. After receiving the packet 100 from the client node 18, the NAT 27 can fill in the entries in the table 500 that the NAT 27 is aware of. Thus, in the first row 506 of the outbound section 502, the source column is filled in with the address A and the destination column is filled in with the address Y of the destination server node 22 and its associated SPI value Sy. Upon translation of the source address by the NAT 27, the next row 508 of the outbound section 502 is filled in with the address X in the source column and the address Y and SPI value Sy in the destination column. The inbound section 504 including rows 510 and 512 may also be filled in with the known information. The SPI value of the client node 18 is not known at this time, so a null or zero value may be used in rows 510 and 512 as a place holder.

Figure 9C:
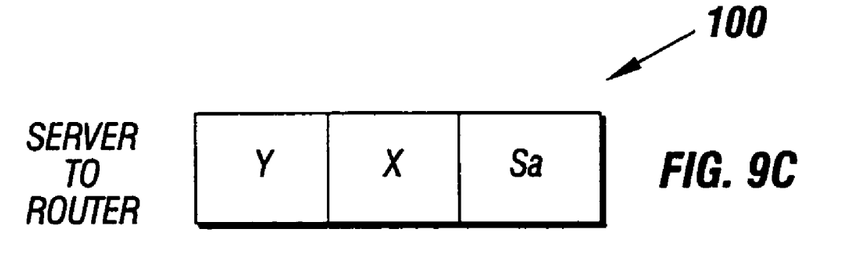
Figure 9D:
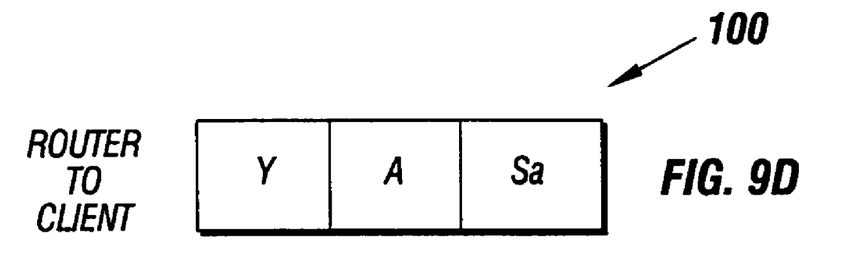
Figure 10B:
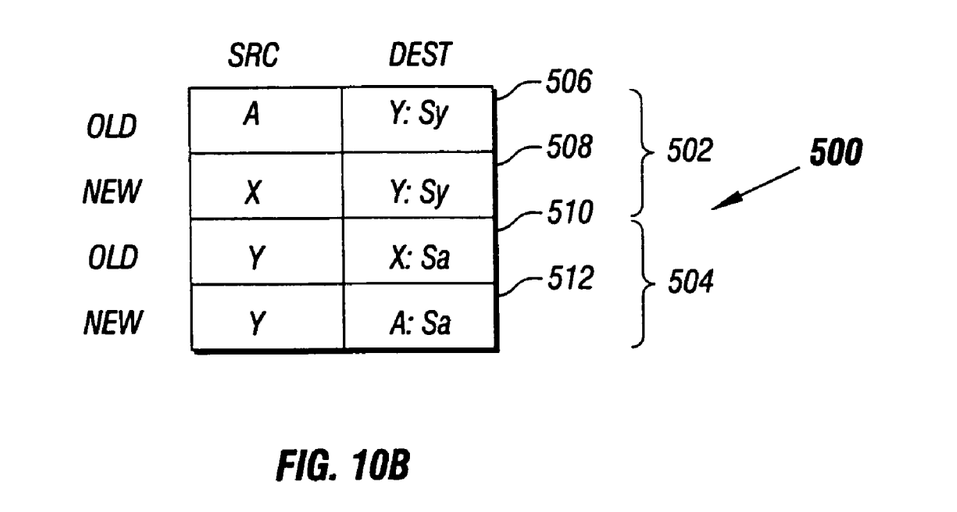

Referring to FIGS. 9C and 9D, a message communicated back from the server node 22 to the router 26, and targeted to the client node 18, contains a source address Y, destination address X, and an SPI value Sa (the SPI value associated with the client node 18). Upon receipt of the packet 100 in FIG. 9C, the NAT 27 attempts to match the information contained in the packet 100 with an address translation table. However, if this is the first communications session between the client node 18 and the server node 22, the address translation table 500 is not completely filled in. To complete the address translation table 500, the NAT 27 matches the source address Y and destination address X to information in the partially filled address translation table 500. The NAT 27 then fills the SPI value Sa into the destination column in rows 510 and 512 (FIG. 10B). Using the new contents of the address translation table 500, the NAT 27 then converts the destination address X (FIG. 9C) to the local network address A of the client node 18 (FIG. 9D).

The NAT 27 may specify some amount of time that the address translation tables (e.g., 400 or 500) are valid. Depending on the type of communications that may occur between nodes coupled to the local network 12 and nodes coupled to the local network 14, such a time period may be variable.

Thus, a method and apparatus has been described that allows translation of a shared or common address to one of multiple local network addresses associated with multiple nodes even though TCP or UDP port numbers are not available. This is accomplished in some embodiments by accessing predetermined security information to perform the translation. In a packet containing ESP information, SPI values may be used. In a packet containing ISAKMP information, the initiator and responder cookies may be used. In one example, such a translation scheme may be employed to allow multiple IPSec nodes to "hide" behind a single IP address. In another example, a virtual private network (VPN) may be set up to allow multiple VPN clients sharing a common network address to access a home or central network. Security can thus be employed to protect data communicated to nodes that sit behind a router including a network address translator for performing many-to-one address translation.

The various control units referred to in this description, such as the control unit 320 in FIG. 6, may include a microprocessor, a microcontroller, a processor card (including one or more microprocessors or controllers), or other control or computing devices. The storage units referred to in this description, such as the storage unit 322 in FIG. 6, may include one or more non-transitory machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions that make up the various software routines, modules, or functions in the various network entities (such as the routers) may be stored in respective storage units. The instructions when executed by a respective control unit cause the corresponding network entity to perform programmed acts.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of routing a data unit targeted to one of a plurality of entities in a network, comprising:
   receiving the data unit, the data unit including security information, a first address, and a second address;
   translating, by a router including a processor, the second address in the data unit to a third address of a target network entity based on the first address and the security information; and
   creating one or more address translation tables used in the translation of the second address, wherein a particular one of the one or more address translation tables contains the first address, the third address of the target network entity, and security information associated with the target network entity,
   wherein receiving the data unit includes receiving an Internet Protocol (IP) packet, wherein the first address is a source IP address, and the second address is a destination IP address, and where the packet includes Encapsulating Security Payload information.

2. The method of claim 1, wherein the second address in the data unit includes a common address associated with the plurality of network entities, and each network entity is assigned a unique network address, and wherein translating the second address includes translating the common address to one of the unique network addresses.

3. The method of claim 1, wherein translating the second address based on the first address and the security information includes translating the second address based on the first address and a Security Parameters Index field of the Encapsulating Security Payload information.

4. A method of routing a data unit targeted to one of a plurality of entities in a network, comprising:
   receiving the data unit, the data unit including security information, a first address, and a second address;
   translating, by a router including a processor, the second address in the data unit to a third address of a target network entity based on the first address and the security information; and
   creating one or more address translation tables used in the translation of the second address, wherein a particular one of the one or more address translation tables contains the first address, the third address of the target network entity, and security information associated with the target network entity,
   wherein receiving the data unit includes receiving an Internet Protocol (IP) packet, wherein the first address is a source IP address, and the second address is a destination IP address,
   wherein the packet includes Internet Security Association and Key Management Protocol information.

5. The method of claim 4, wherein translating the second address includes translating the second address based on initiator and responder cookies of the Internet Security Association and Key Management Protocol information.

6. The method of claim 1, further comprising matching the first address and security information in the received data unit with the information in the particular address translation table.

7. A router for use in a network having one or more entities, the router comprising:
   a processor;
   an interface adapted to receive a data unit, the data unit containing address information and a field having security information, wherein the data unit includes an Internet Protocol packet, the address information comprising an Internet Protocol address, wherein the field having the security information in the data unit comprises a Security Parameters Index field in an Encapsulating Security Payload header; and
   a translator executable on the processor to convert the address information in the data unit to an identifier of a network entity that the data unit is targeted for based on the security information, the identifier to replace the address information in the data unit.

8. The router of claim 7, wherein the translator includes a many-to-one network address translator.

9. A router for use in a network having one or more entities, the router comprising:
 a processor;
 an interface adapted to receive a data unit, the data unit containing address information and a field having security information; and
 a translator executable on the processor to convert the address information in the data unit to an identifier of a network entity that the data unit is targeted for based on the security information, the identifier to replace the address information in the data unit,
 wherein the data unit includes an Internet Protocol packet, the address information comprising an Internet Protocol address,
 wherein the field having the security information in the data unit comprises initiator and responder cookies in an Internet Security Association and Key Management Protocol header.

10. A router for use in a network having one or more entities, the router comprising:
 a processor;
 an interface adapted to receive a data unit, the data unit containing address information and a field having security information; and
 a translator executable on the processor to convert the address information in the data unit to an identifier of a network entity that the data unit is targeted for based on the security information, the identifier to replace the address information in the data unit,
 wherein the address information in the received data unit includes a source address and a destination address, the router further comprising a storage medium to store one or more address translation tables containing routing information accessible by the translator, wherein a particular one of the one or more address transaction tables includes the source address, the identifier of the network entity, and the security information.

11. An article including one or more non-transitory machine-readable storage media containing instructions for routing a data unit targeted to an entity on a network, the instructions when executed causing a processor to:
 receive the data unit, the data unit containing address information and security information to provide secure communications of the data unit, wherein the address information includes an Internet Protocol address, and wherein the security information comprises a Security Parameters Index field in an Encapsulating Security Payload header;
 translate the address information in the data unit to an address of the network entity that the data unit is targeted to based on the security information; and
 replace, in the data unit, the address information in the data unit with the address of the network entity.

12. An article including one or more non-transitory machine-readable storage media containing instructions for routing a data unit targeted to an entity on a network, the instructions when executed causing a processor to:
 receive the data unit, the data unit containing address information and security information to provide secure communications of the data unit, wherein the address information includes an Internet Protocol address, and wherein the security information includes initiator and responder cookies in an Internet Security Association and Key Management Protocol header;
 translate the address information in the data unit to an address of the network entity that the data unit is targeted to based on the security information; and
 replace, in the data unit, the address information in the data unit with the address of the network entity.

13. An article including one or more non-transitory machine-readable storage media containing instructions for routing a data unit targeted to an entity on a network, the instructions when executed causing a processor to:
 receive the data unit, the data unit containing address information and security information to provide secure communications of the data unit; and
 replace, in the data unit, the address information in the data unit with an address of the network entity, wherein the address information in the data unit is translated to the address of the network entity based on the security information,
 wherein the address information in the received data unit comprises a source address and a destination address, and wherein the one or more machine-readable storage media contain instructions that when executed causes the processor to access an address translation table to match the source address and the security information in the received data unit to information in the address translation table, wherein the address translation table contains the source address, the address of the network entity, and the security information.

14. The article of claim 13, wherein the one or more machine-readable storage media contain instructions that when executed causes the processor to match the source address and security information in the received data unit with the source address and security information in the address translation table.

15. A method of routing a data unit targeted to one of a plurality of entities in a network, comprising:
 receiving the data unit, the data unit including security information and address information, the security information including Internet Security Association and Key Management Protocol (ISAKMP) information; and
 converting, by a router including a processor, the address information in the data unit to an address of a target network entity based on the ISAKMP information, the address of the target network entity replacing the address information in the data unit,
 wherein the address information in the received data unit includes a source address and a destination address, the method further comprising creating an address translation table used in the translation of address information, the address translation table containing the source address, the address of the target network entity, and ISAKMP information associated with the target network entity.

16. The method of claim 15, wherein the address information in the data unit includes a common address associated with the plurality of network entities, and each network entity is assigned a unique network address, and wherein converting the address information includes converting the common address to one of the unique network addresses.

17. The method of claim 15, wherein converting the address information includes converting the address information based on initiator and responder cookies of the ISAKMP information.

18. The method of claim 15, further comprising matching the source address and ISAKMP information in the received data unit with the source address and ISAKMP information in the address translation table.

19. A router for use in a network having one or more entities, the router comprising:
 a processor;

an interface adapted to receive a data unit, the data unit containing a source address, a destination address, and a field having security information, the security information including Internet Security Association and Key Management Protocol (ISAKMP) information; and a translator executable on the processor to generate an identifier of a network entity that the data unit is targeted for based on the ISAKMP information, and to replace an address in the data unit with the identifier; and a storage medium to store an address translation table containing the source address, the identifier of the network entity, and the ISAKMP information, wherein the translator is to match the source address and ISAKMP information in the received data unit with the source address and ISAKMP information in the address translation table.

20. A router for use in a network having one or more entities, the router comprising:

a processor;

an interface adapted to receive a data unit, the data unit containing a source address, a destination address, and a field having security information, the security information including Internet Security Association and Key Management Protocol (ISAKMP) information; and a translator executable on the processor to generate an identifier of a network entity that the data unit is targeted for based on the ISAKMP information, and to replace an address in the data unit with the identifier, wherein the data unit contains initiator and responder cookies in an ISAKMP header.

21. The router of claim 10, wherein the translator is to match the source address and security information in the received data unit with corresponding information in the particular address translation table.

22. The article of claim 13, wherein the address translation table further contains the destination address in the received data unit.

* * * * *